United States Patent  [15] 3,640,681
Pickert  [45] Feb. 8, 1972

[54] PROCESS FOR PREPARING SUPERSILICEOUS ZEOLITES

[72] Inventor: Paul Eugene Pickert, Katonah, N.Y.

[73] Assignee: Union Carbide Corporation, New York, N.Y.

[22] Filed: Dec. 17, 1969

[21] Appl. No.: 885,981

[52] U.S. Cl. ................................................23/111, 252/455
[51] Int. Cl. .......................................................C01b 33/28
[58] Field of Search .....................23/111, 112, 113; 252/455; 208/120; 260/448 R

[56] References Cited

UNITED STATES PATENTS

| | | | |
|---|---|---|---|
| 3,506,400 | 4/1970 | Eberly et al. | 23/111 X |
| 3,474,464 | 10/1969 | Matthews et al. | 260/448 X |
| 3,442,795 | 5/1969 | Kerr et al. | 208/120 |
| 3,130,006 | 4/1964 | Rabo et al. | 23/111 X |
| 3,436,174 | 4/1969 | Sand | 23/113 |

*Primary Examiner*—Edward J. Meros
*Attorney*—Paul A. Rose, Thomas I. O'Brien and Richard G. Miller

[57] ABSTRACT

Framework aluminum is extracted from crystalline zeolitic molecular sieves, using acetylacetone as the extracting agent. Prior to contact with the acetylacetone, the zeolite must be rendered substantially cation-deficient and be at least partially dehydroxylated. Other metal values can be substituted for the framework aluminum by contacting the zeolite either before or after acetylacetone extraction with a metal acetylacetonate. The products are useful hydrocarbon conversion catalysts.

8 Claims, No Drawings

PROCESS FOR PREPARING SUPERSILICEOUS ZEOLITES

The present invention relates in general to novel zeolitic molecular sieves and to the process for their preparation. More particularly, the invention relates to zeolitic molecular sieves formed by modifying prior known large pore molecular sieves whereby the silicon-to-aluminum ratio is greatly increased beyond that of the parent zeolite with retention of the crystalline character thereof. In some instances, aluminum in the zeolitic crystalline structure is substituted by other metals.

In the conversion of hydrocarbons to more useful products, such as by catalytic cracking methods, a variety of siliceous substances have been utilized. The activity of such catalysts has been generally attributed to their "acid nature," since the reactions involved resemble those catalyzed by acidic materials such as sulfuric acid and aluminum chloride. Among the well-known siliceous catalysts for hydrocarbon conversion reactions are acid-leached and calcined bentonites, bauxite and synthetic silica-alumina and silica-magnesia composites. More recently, synthetic crystalline zeolites, particularly those having large pores such as zeolites X, Y, L and certain synthetic and natural mordenites, have been intensively investigated and developed as bases for hydrocarbon conversion catalysts. These versatile and intricate crystalline materials are remarkable in their ability to be extensively modified by physical and chemical means without destruction of their basic crystalline character. Accordingly, attempts to increase the silica/alumina ratio of crystalline zeolites by removal of aluminum from the crystal structure with strong acids have heretofore been reported. Further, the silica/alumina ratio of zeolites have been increased by converting the parent zeolite at least partially to its hydrogen form, hydrolyzing the aluminum to aluminum hydroxide, and thereafter physically removing the displaced aluminum.

It has been found that the silica/alumina ratio of natural and synthetic zeolitic molecular sieves which have pores sufficiently large to adsorb benzene in their internal cavities can be increased by the removal of aluminum from the crystalline structure under anhydrous conditions. This is accomplished in accordance with the process of the present invention by contacting the desired zeolite species in its cation deficient and partially dehydroxylated state with acetylacetone and/or a metal acetylacetonate at ambient room temperature or higher for a time sufficient to form aluminum acetylacetonate, and thereafter removing the aluminum acetylacetonate thus formed from the zeolite.

The zeolites suitable employed in the practice of this invention should, in addition to having pores at least large enough to adsorb benzene, i.e., be the so-called large pore zeolites, also have initial silica/alumina ratios sufficiently large that the zeolite can be rendered substantially cation deficient and withstand the stress on the crystal lattice which results from dehydroxylation.

By the term "substantially cation deficient" it is meant that at least a substantial number, i.e., 20 percent or more of framework aluminum atoms of the zeolite which, assuming zeolitic stoichiometry, would ordinarily be associated with a cation to balance the electrovalent negative charge resulting from fourfold coordination with oxygen, i.e., $AlO_4^-$, are not associated with cations and remain a part of the crystal lattice, some of which presumably are in the electrovalently neutral form of threefold coordination with oxygen.

By the term "dehydroxylation" as used herein the definition of this invention is meant the removal, normally in the form of water, of at least some and preferably substantially all of the zeolite structural OH which exhibit an infrared stretching frequency in the ranges of about 3,600–3,660 cm.$^{-1}$ and about 3,500–3,560 cm.$^{-1}$, depending upon certain structural features of the particular zeolite involved. These latter structural features are not significant with respect to the present invention. The aforesaid OH are formed in the zeolite by various techniques now well known. For example, if a zeolite as synthesized or as found in nature contains metallic cations such as $Na^+$, $K^+$, $Ca^{++}$, etc., these metallic cations can be removed and replaced by moderate leaching with an aqueous mineral acid solution or even by intensive leaching with water. It can be visualized that the result of such leaching is the introduction of hydrogen cations into the zeolite in place of the metal cations formerly present, but whether this actually occurs is not here important. It can be readily determined, however, that the result of such leaching and activation is the production of OH apparently identical zeolite form can be obtained by ion exchanging the same zeolite starting material with ammonium or substituted ammonium cation and thereafter thermally decomposing the ammonium cations to evolve ammonia. At temperatures near 300° C. the formation of OH having the same infrared stretching frequencies as those formed by acid or water leaching and activation is readily established by infrared analysis.

Once the OH groups are formed the zeolite can be considered to be cation deficient, but the removal of at least some of this OH, preferably by thermal means, is necessary prior to proceeding with extraction of framework aluminum. Such OH removal is easily accomplished by heating the hydroxylated zeolite form at temperatures of from about 400° C. up to the crystal destruction point, preferably between about 450° and 700° C.

As a rule with three-dimensional crystalline zeolites, the higher the molar $SiO_2/Al_2O_3$ ratio the greater the relative degree of cation deficiency and dehydroxylation the crystal structure can tolerate. Where cations are to be removed to the extent that more than about two-thirds of the structural aluminum atoms are rendered free of association with a cation, the $SiO_2/Al_2O_3$ molar ratio of the starting zeolite should be greater than 3, and preferably greater than 3.5. For lesser degrees of cation deficiency, $SiO_2/Al_2O_3$ molar ratios of from 2 to 3 can be employed. Illustrative of the zeolites which can be used in providing the products of this invention are zeolite-Y (described in detail in U.S. Pat. No. 3,130,007), zeolite-L (as defined in U.S. Pat. No. 3,216,789), zeolite-X (as defined in U.S. Pat. No. 2,882,244), and zeolite-Ω, definitively described in copending U.S. application Ser. No. 569,805, filed Aug. 3, 1966, and synthetic mordenite such as described in U.S. Pat. No. 3,436,174.

Cation exchange of the molecular sieve using solutions containing ammonium ions as the first step toward preparation of the novel compositions of this invention is preferred. Such exchange can be effected by a batchwise-type ion exchange wherein the molecular sieve is slurried in an aqueous ammonium salt solution. In addition, the exchange can be effected by a continuous technique wherein a solution of ammonium cation is passed over a column of the zeolite such that the effluent containing the formed salt is continuously removed.

The latter method is favored for high degrees of cation exchange. For example, in an 85-100 percent removal of the zeolite cation by ion exchange, a heated, continuous exchange technique is desirable. It is usually necessary to have repeated batchwise ion exchanges in order to remove the additional zeolite cations. Batchwise ion exchanges at elevated temperatures of about 80° to 100° C. are more efficient than similar exchanges at room temperature for the higher degrees, i.e., over 50 percent of ion exchange.

Any soluble ammonium salts can be used to effect the ion exchange of the zeolitic cation providing the resulting salt formed during the ion exchange is soluble. If the formed salt is insoluble, it would be very difficult to remove by washing. Since most common ammonium salts are water soluble, this limitation is concerned primarily with the zeolitic cation to be exchanged, i.e., a silver-exchanged zeolite exchanged with ammonium chloride solution would result in the formation of insoluble AgCl. In this case, a solution of ammonium nitrate would be preferred since $AgNO_3$ is soluble in $H_2O$, the preferred exchanging medium. It is to be understood, moreover, that substituted ammonium cations, as exemplified by the various methylammonium ions, can also be employed in the practice of our invention.

Since most molecular sieve zeolites are synthesized in the alkali metal cation form, most of the ammonium ion exchanges will be effected with these cations. However, ammonium ion exchange with other cation-containing zeolites is possible, within the previously mentioned definitive limits.

It may be desirable at times to acid wash, within the limitations of this process, zeolites prior to the ammonium ion exchange to effect a certain degree of hydrogen cation exchange. More significantly, this may be done also to remove difficulty removable impurities in the zeolite such as sodium silicate, sodium aluminate or sodium hydroxide remaining from the synthesis of the zeolite. Hence, this procedure serves as a prepurification process.

As indicated heretofore, the removal or destruction of the ammonium or hydrogen cations of the ion-exchanged molecular sieve zeolites is generally accomplished by thermally heating the zeolite to a temperature of above about 400° C. and up to the temperature at which extensive crystal degradation takes place, i.e., below about 1,000° C. It is found, for reasons not fully understood, that for purposes of this invention, temperatures of at least about 400° C. must be used. The amount of subsequently extractable aluminum is almost linear with the calcination temperature as it is increased from 400° C. to about 700° C. At 700° C. the amount of aluminum which can be extracted approaches asymptotically the quantum associated with nonmetallic cations prior to calcination. Thus, a framework aluminum atom which is still associated with a cation or hydroxyl is not extractable within the scope of this invention. The length of the heating period should be at least 0.1 hour, and preferably at least 2 hours, within the aforesaid temperature range.

When it is desired only to extract aluminum from the zeolite framework without introducing another metal to the zeolite, the extracting material is acetylacetone. This compound is apparently unique for this purpose since the closely related compound 2,5-hexanedione is found to be ineffective.

Since the heat of adsorption of acetylacetone on a molecular sieve zeolite is relatively high, it is advantageous initially to adsorb a stable liquid such as benzene on the thermally treated zeolite to avoid possible self-condensation of the acetylacetone. The temperature of the extraction step is not narrowly critical, but should be such that the acetylacetone is in the liquid state. Preferably, the extraction is done at temperature within the range of 0° C. to about 200° C. Pressure is also not a critical factor, but should be such that the interrelationship of pressure and temperature results in the acetylacetone being in the liquid state.

The method of extraction can be either dynamic or static. Dynamic techniques such as the normal operation using a Soxhlet extractor are preferred, but merely soaking the cation deficient and dehydroxylated zeolite crystals in acetylacetone is effective. Time is not a critical factor, but generally at least 2 hours of contact time is allowed for static methods. Somewhat less time is required for the dynamic methods, i.e., at least about 0.5 hour. Generally, extraction periods greater than about 24 hours are not required. The relative proportions of acetylacetone and zeolite are not critical. It has been found, however, that the use of from about 1.5 to about 20 moles acetylacetone per hundred grams zeolite (anhydrous basis) is preferably employed. Complete removal of the chelate reaction product of the aluminum and the acetylacetone, $Al(C_5H_7B\cdot2)_3$, from the zeolite is accomplished by conventional desorption means, preferably washing with additional acetylacetone or an organic solvent such as benzene, xylene or acetone.

Following the extraction of the aluminum, the zeolitic molecular sieve can be treated in the same manner as conventional zeolitic molecular sieves, i.e., they can be ion-exchanged, decationized (if not already fully so), activated, steamed, pelleted, agglomerated with or without active or inert diluent material, metal loaded and the like. The super-siliceous zeolites of this invention are thus still entirely satisfactory for selective adsorption processes, but have their greatest utility as hydrocarbon conversion catalysts or catalyst bases.

When it is desired to extract aluminum from the zeolite crystal framework and replace at least a portion of that aluminum with a different metal value, the extracting medium comprises a metal acetylacetonate, either alone or in combination with acetylacetone and/or other solvents such as benzene. It can be theorized that the reaction involving the metal acetylacetonate and the zeolite proceeds according to either or a combination of two mechanisms, the first being a metathesis type in which the metal of the metal acetylacetonate and the aluminum are interchanged, and the second being the reaction of the metal acetylacetonate with the zeolitic hydrogen postulated to have been produced by the prior extraction of framework aluminum by acetylacetone. Thus, conceivably, it is possible to introduce a metal other than aluminum into the zeolite framework, (a) directly by contacting the cation deficient dehydroxylated zeolite as hereinbefore described with a metal acetylacetonate in the absence of acetylacetone, or (b) by the stepwise procedure in which the cation deficient dehydroxylated zeolite is first treated with acetylacetone to extract framework aluminum atoms and thereafter treating the extracted zeolite with a metal acetylacetonate. The use of acetylacetone and a metal acetylacetonate in combination with or without other inert solvents is found to be effective to extract framework aluminum and impart another metal to the zeolite, and thus presumably the mechanisms of both aforementioned reactions are operable simultaneously.

Whereas hereinbefore the term "metal acetylacetonate" has been employed in described one embodiment of this invention, it is to be understood that metal complexes such as vanadyl acetylacetonate, titanylacetylacetonate and uranyl acetylacetonate, which contain less than the number of acetylacetonyl moieties necessary to satisfy the valence of the particular metal of the complex, are also included within the term. Any metal acetylacetonate is suitable, but it is especially preferred to employ metal acetylacetonates of metals which form oxides in their trivalent, tetravalent or pentavalent states which are thermally stable at 600° C.

Illustrative of the acetylacetonates which are suitable for use in this invention are those having the general formula: wherein (AA) is the acetylacetonyl moiety ($C_5H_7O_2$), and M is $V^{+3}$, $VO^{+2}$, $TiO^{+2}$, $UO_2^{+2}$, $Ba^{+2}$, $Be^{+2}$, $Cd^{+2}$, $Ca^{+2}$, $Cs^{+1}$, $Ce^{+3}$, $Cr^{+3}$, $Co^{+2}$, $Co^{+3}$, $Cu^{+2}$, $Fe^{+3}$, $Fe^{+2}$, $Pb^{+2}$, $Mg^{+2}$, $Mn^{+2}$, $Mn^{+3}$, $MoO_2^{+2}$, $Ni^{+2}$, $Pd^{+2}$, $Re^{+3}$, $Rh^{+3}$, $Rb^{+3}$, $Na^{+1}$, $Sr^{+2}$, $Tl^{+1}$, $Th^{+4}$, $Zn^{+2}$, $In^{+3}$, $La^{+3}$, $Nd^{+3}$, $Sm^{+3}$, $Yb^{+3}$, $Y^{+3}$, $Er^{+3}$, $Gd^{+3}$, $Pr^{+3}$, $Dy^{+3}$, and $Zr^{+4}$, and $n$ is the valence of the metal moiety, i.e., the residue of the complex after theoretical removal of the acetylacetonyl moiety or moieties.

As in the case of simple extraction of framework aluminum without substitution of another metal therefor, the relative proportions of zeolite and metal acetylacetonate are not critical. Large stoichiometric excesses of either of the reactants are permissible. The same time, temperature and pressure reaction conditions are applicable in both cases. The processes are exemplified hereinafter in the examples.

EXAMPLE 1

A. A series of samples of cation-deficient zeolite-X and zeolite-Y of various $SiO_2/Al_2O_3$ mole ratios and degrees of cation deficiency were prepared in a conventional manner. In each case the starting zeolite in the sodium cation form was slurried in distilled water and formed into a filter precipitate in a Buchner funnel. Using a slightly reduced pressure under the filter cake, an aqueous solution of $NH_4Cl$ was drawn therethrough until the desired amount of sodium ions had been replaced by $NH_4^+$ ions, as determined by depletion of ammonium ions from the ion exchange solution. The product zeolite was thereafter washed with distilled water until free of chloride ions, dried in air, pressed into tablets about 3/16 inch in diameter and heated in an oven purged with air for 6 hours at a temperature of 550° C.

B. The zeolite samples prepared in part A supra were each saturated with benzene and placed in a Soxhlet extractor containing acetylacetone as the extracting material. The extraction was carried out at reflux temperature, i.e., about 139° C. for 6 hours. The removal of aluminum from the zeolite framework was clearly indicated by the development of a bright orange color in the extraction medium, which is due to the presence of the complex of one molecule of aluminum with three molecules of acetylacetone, hereinafter identified as Al(AA)$_3$. Extraction was terminated when the development of the orange color has ceased. The extracted zeolite tablets were rehydrated in air and analyzed chemically. Portions of each sample were calcined at 1020° F. for 6 hours and subjected to X-ray analysis. The pertinent data are set forth in Table I.

TABLE I

| Ex. | Zeolite | Ammonium exchanged forms | | | Calcined and extracted forms | |
|---|---|---|---|---|---|---|
| | | SiO$_2$/Al$_2$O$_3$ | Cations per 100 Al | | SiO$_2$/Al$_2$O$_3$ | Na$^+$ cations per 100 Al |
| | | | Na$^+$ | NH$_4^+$ | | |
| 1 | NH$_4$X | 2.49 | 52.7 | 30.0 | 3.26 | 62.6 |
| 2 | NH$_4$X | 2.48 | 48.3 | 34.4 | 3.30 | 60.0 |
| 3 | NH$_4$X | 2.48 | 41.8 | 39.1 | 4.38 | 71.5 |
| 4 | NH$_4$X | 2.54 | 39.0 | 41.1 | 4.26 | 65.8 |
| 5 | NH$_4$X | 2.49 | 37.0 | 42.7 | 3.89 | 61.6 |
| 6 | NH$_4$X | 2.48 | 33.2 | 47.8 | 4.23 | 58.8 |
| 7 | NH$_4$Y | 4.98 | 74.4 | 12.9 | 5.02 | 74.6 |
| 8 | NH$_4$Y | 4.94 | 56.7 | 28.7 | 5.74 | 66.9 |
| 9 | NH$_4$Y | 4.94 | 49.7 | 37.7 | 6.79 | 72.1 |
| 10 | NH$_4$Y | 4.91 | 42.0 | 44.4 | 8.32 | 73.8 |
| 11 | NH$_4$Y | 5.16 | 37.6 | 57.8 | 9.54 | 75.7 |
| 12 | NH$_4$Y | 5.03 | 33.4 | 61.5 | 11.1 | 77.8 |
| 13 | NH$_4$Y | 4.86 | 16.6 | 71.8 | 16.7 | 69.7 |
| 14 | NH$_4$Y | 4.92 | 78.7 | 8.14 | 4.81 | 92.4 |
| 15 | NH$_4$Y | 4.88 | 73.6 | 13.8 | 4.78 | 79.4 |
| 16 | NH$_4$Y | 4.94 | 57.6 | 31.0 | 5.94 | 79.7 |
| 17 | NH$_4$Y | 4.77 | 55.2 | 38.0 | 6.68 | 77.3 |
| 18 | NH$_4$Y | 4.84 | 47.6 | 47.6 | 6.93 | 74.8 |
| 19 | NH$_4$Y | 4.92 | 31.6 | 60.5 | 9.84 | 69.6 |
| 20 | NH$_4$Y | 4.83 | 25.2 | 69.0 | 10.5 | 63.4 |
| 21 | NH$_4$Y | 4.94 | 24.8 | 72.2 | 11.59 | 62.5 |
| 22 | NH$_4$Y | 4.90 | 19.7 | 77.4 | 14.32 | 59.8 |

X-ray examination established the retention of crystallinity of the extracted zeolites.

Example 23

To demonstrate that the acetylacetone-extracted zeolites of this invention are further ion exchangeable and have good catalytic activity, 169.7 grams of zeolite-Y rendered about 40 percent cation-deficient and having a SiO$_2$/Al$_2$O$_3$ ratio of 4.94 were charged to an extraction tube fitted with a water condenser in the form of 3/16-inch pellets. To a 250-ml. round-bottomed flask heated by a heating mantle was charged 100 cc. of acetylacetone. This flask was connected to the extraction tube-condenser unit. The acetylacetone was heated to reflux so that the condensed solvent collected and passed over the zeolite pellets. Extraction continued for approximately 6 hours, after which the solvent complex, Al(AA)$_3$, was separated from the zeolite by using two benzene extractions. The treated zeolite product was dried and then calcined. For the calcination process, the zeolite pellets were placed in a stainless steel basket and placed in a vented thermostated oven. An air purge of 75–80 c.f.h. is maintained during calcination. The charge is heated to ≈480° F. and held for 2 hours; and finally heated to 1,020° F. and held thereat for 2½ hours. Analysis of samples of the extracted product indicated a SiO$_2$/Al$_2$O$_3$ molar ratio of 6.94 and a Na$_2$O/Al$_2$O$_3$ molar ratio of 0.721. The amount of aluminum acetylacetonate complex extracted was 0.319 grams per gram of zeolite. X-ray analysis after calcination of the extracted product indicated a better than two-thirds retention of crystallinity. A portion (41 grams, hydrated basis) of the extracted product was contacted with an aqueous ammonium chloride solution. Four batchwise exchanges were conducted employing four equivalents of NH$_4^+$ cation per equivalent of aluminum in the zeolite. This exchange involved continuously stirring the slurry of zeolite and ammonium chloride solution for 2½ hours at room temperature, followed by filtration with suction and washing of the solids with distilled water. This procedure was repeated four times, using fresh exchanging solution each time. After the final washing, the solids were dried in an oven at 124° C., granulated and bottled. Analysis of the exchanged product indicated:

| | |
|---|---|
| SiO$_2$/Al$_2$O$_3$ | 6.93 |
| Cations per 100 Al | |
| Na | 0.081 |
| NH$_4$ | 0.766 |

X-ray analysis of the calcined product showed a retention of the type-Y crystal structure. The product after being calcined at 1,020° F. for 4 hours was tested for alkylation activity in accordance with the following procedure:

The catalyst product (5.0 grams) was suspended in 200 cc. of benzene, and propylene gas at a flow rate of 400 cc./min. was added below the surface of the stirred suspension. Activity was measured by observing the rate of disappearance of unreacted benzene under standard reaction conditions, namely, atmospheric pressure and adiabatic temperature conditions starting at room temperature. The reaction is allowed to continue until the exothermic reaction is complete and the temperature starts to fall.

The following data, based on analysis of products sampled at specified time intervals, were obtained:

| Time, Minutes | Composition of reaction mixture, wt. % | | | | |
|---|---|---|---|---|---|
| | Benzene | Isopropylbenzene mono- | di- | tri- | tetra- |
| 10 | 72.2 | 21.8 | 5.5 | 0.5 | — |
| 20 | 56.9 | 27.3 | 13.1 | 2.5 | 0.2 |
| 30 | 44.2 | 29.7 | 19.9 | 5.7 | 0.5 |
| 60 | 19.6 | 20.8 | 30.9 | 24.8 | 3.9 |
| 120 | 0.3 | 0.6 | 10.3 | 76.9 | 11.4 |

The rapid utilization of benzene, i.e., conversion into several alkylated benzenes, indicates the high catalytic activity of this supersiliceous zeolite product of the invention.

Example 24

A partially ammonium-exchanged type-Y zeolite with a SiO$_2$/Al$_2$O$_3$ molar ratio of 5.0±0.1 was prepared by a batchwise exchange with 0.6 equivalent of NH$_4$Cl per equivalent of zeolite base exchange capacity. The following analyses were obtained:

| Component | Found | Calc'd. on Anhydrous Basis | Molar Ratios |
|---|---|---|---|
| SiO$_2$ | 49.3 wt. % | 65.5 | Na$_2$O:Al$_2$O$_3$= 0.555 |
| Al$_2$O$_3$ | 16.9 | 22.5 | (NH$_4$)$_2$O:Al$_2$O$_3$= 0.383 |
| Na$_2$O | 5.7 | 7.6 | SiO$_2$:Al$_2$O$_3$= 4.96 |
| (NH$_4$)$_2$O | 3.3 | 4.4 | |
| LOI | 28.1 | | |

This material was tableted into 3/16-inch diameter by 3/16-inch long tablets to facilitate calcination and extraction, and calcined by heating in an oven purged with air to 450° F. for 2 hours, and finally at about 1,020° F. for an additional 2–3 hours. The anhydrous tablets, after wetting with benzene were continuously extracted with acetylacetone in a Soxhlet extractor until the extractant was colorless. The extracted zeolite was then exposed to atmospheric moisture and allowed to rehydrate.

The ammonium form of the extracted zeolite was prepared by ion exchange with NH$_4$Cl solution. Five batchwise exchanges were employed, with four equivalents. of NH$_4^+$ to each aluminum present to ensure a high degree of sodium replacement. The following analysis was obtained:

| Component | Found | Calc'd. on Anhydrous Basis | Molar Ratios |
|---|---|---|---|
| SiO$_2$ | 58.4 wt. % | 74.4 | Na$_2$O/Al$_2$O$_3$= 0.06 |
| Al$_2$O$_3$ | 13.7 | 17.5 | (NH$_4$)$_2$O/Al$_2$O$_3$= 0.846 |
| Na$_2$O | 0.5 | 0.64 | SiO$_2$/Al$_2$O$_3$= 7.23 |
| (NH$_4$)$_2$O | 5.9 | 7.5 | |
| LOI | 27.4 | | |

A portion of this material was Pd-loaded with 0.5 wt. percent by ion exchange with $Pd(NH_3)_4^{+2}$, calcined at 1,020° F. and evaluated as a hydrocracking catalyst, hereinafter denominated catalyst "A."

Another portion of the ammonium-exchanged form were back exchanged with a solution of 3.1 equivalents of $MgSO_4$ per aluminum present. The following analyses were obtained:

| Component | Found | Calc'd. to Anhydrous Basis | Molar Ratios |
|---|---|---|---|
| $SiO_2$ | 55.5 | 74.4 | $Na_2O/Al_2O_3$=0.05 |
| $Al_2O_3$ | 13.2 | 17.7 | $(NH_4)_2O/Al_2O_3$=0.40 |
| $Na_2O$ | 0.4 | 0.54 | $MgO/Al_2O_3$=0.52 |
| $(NH_4)_2O$ | 2.7 | 3.5 | $SiO_2/Al_2O_3$=7.1 |
| MgO | 2.7 | 3.5 | |
| CaO | 0.1* | 0.13 | |
| LOI | 28.1 | | |

*Present as an impurity in starting zeolite.

This magnesium back-exchanged catalyst was loaded with 0.5 weight-percent palladium, calcined at 1,020° F. and evaluated as a hydrocracking catalyst, hereinafter denominated catalyst "B." The following results were obtained for the two catalysts prepared by the method of this example using a hydrofined hydrocracking feed stock with an endpoint of 850° F. The results are shown below in Table II:

TABLE II

| Catalyst | A | B |
|---|---|---|
| Weight of catalyst, g. | 28.90 | 30.33 |
| Temp. ° F. for 50% Conversion to gasoline product at: | | |
| 10 hr. | — | 480 |
| 25 hr. | 500 | 495 |
| 50 hr. | 503 | 495 |
| 75 hr. | 508 | 495 |
| 100 hr. | 512 | — |
| 125 hr. | 520 | — |

Example 25

Zeolite-Y, having an initial $SiO_2/Al_2O_3$ ratio of 5.0 was rendered cation deficient, dehydroxylated, extracted with acetylacetone and ion exchanged with magnesium cations and cerium cations. In all, 10 samples were prepared, five of which contained magnesium cations and five which contained $Ce^{+3}$ cations. The activated samples (calcined at 1,020° F. for 4 hours.) were tested for catalytic activity in the alkylation of benzene with isopropylene as in Example 23.

The results are shown in Table III below:

TABLE III.—$Mg^{+2}$ EXCHANGED SAMPLE

| $Mg^{+2}$ equivalents/100 Al | 50 | | 34 | | 62 | | 60 | |
| --- | --- | --- | --- | --- | --- | --- | --- | --- |
| $Na^{+1}$ equivalents/100 Al | 22 | | 25 | | 21 | | 9 | |
| $SiO_2/Al_2O_3$ (mol ratio) | 5.74 | | 6.97 | | 8.32 | | 16.65 | |
| Reaction time, min | 10 | 20 | 10 | 20 | 10 | 20 | 10 | 20 |
| Product distribution wt. percent: | | | | | | | | |
| Benezene | 87.2 | 85.2 | 88.3 | 87.7 | 88.3 | | 93.3 | 91.0 |
| Mono-Isopropylbenzene | 10.9 | 1.27 | 11.0 | 9.8 | 10.4 | | 5.6 | 7.5 |
| di-Isopropylbenzene | 0.6 | 0.8 | 0.7 | 0.6 | 0.8 | | 0.3 | 0.8 |
| tri-Isopropylbenzene | 0.1 | 0.1 | | | | | | |

$Ce^{+3}$ EXCHANGED SAMPLE

| $Ce^{+3}$ equivalents/100 Al | 66 | | 64 | | 64 | | 56 | |
| --- | --- | --- | --- | --- | --- | --- | --- | --- |
| $Na^{+1}$ equivalents/100 Al | 16 | | 18 | | 17 | | 7 | |
| $SiO_2/Al_2O_3$ (mol ratio) | 5.74 | | 6.97 | | 8.32 | | 16.65 | |
| Reaction time, min | 10 | 20 | 10 | 20 | 10 | 20 | 10 | 20 |
| Product distribution wt. percent: | | | | | | | | |
| Benzene | 89.8 | 82.9 | 87.1 | 85.1 | 78.4 | | 88.0 | 85 |
| mono-Isopropylbenzene | 12.7 | 14.1 | 11.8 | 12.7 | 17.7 | | 9.8 | 10.9 |
| di-Isopropylbenzene | 1.3 | 0.7 | 1.1 | 1.3 | 2.8 | | 1.1 | 1.15 |
| tri-Isopropylbenzene | 0.1 | 0.1 | | | 0.1 | | 0.2 | 0.2 |

Example 26

A dehydroxylated, 58 percent cation-deficient zeolite-Y sample having a $SiO_2/Al_2O_3$ molar ratio of 5 and weighing about 10 grams is held in contact at reflux temperature for about 30 hours with about 250 grams of a xylene solution containing 2 grams vanadyl acetylacetonate and about 5 grams acetylacetone. During the contact period the color of the solution changed from blue to green. The zeolite was thereafter separated from the solution and washed with benzene until the washings were colorless. The following analysis was obtained:

| Component | Wt. % Found | Wt. % on Anhydrous Basis |
|---|---|---|
| $SiO_2$ | 50.4±0.5 | 69.5 |
| $Al_2O_3$ | 15.2±0.5 | 20.9 |
| $Na_2O$ | 3.8±0.2 | 5.2 |
| $V_2O_5$ | 2.4±0.3 | 3.3 |
| LOI | 27.4±0.5 | |
| Atoms ratios: | Si/Al=2.83 (2.50 in Starting Material) Si/Al+V)=2.57 | |

These analyses indicate that nearly as much vanadium was incorporated as Al was removed since the Si(Al+V) ratio was nearly the same as the starting material. Al was definitely removed. An X-ray analysis showed excellent retention of the zeolite-Y-type crystallinity and no new lines on the diffraction pattern.

Example 27

A 10-gram sample of supersiliceous zeolite-Y which had previously been extracted with acetylacetone to form a product having a $SiO_2/Al_2O_3$ molar ratio of 10.4 and a $Na_2O/Al_2O_3$ molar ratio of 0.74 is contacted with about 2 grams of chromium acetylacetonate in 250 grams xylene. The mixture was boiled at acetylacetonate in 250 grams xylene. The mixture was boiled at atmospheric pressure until nearly all of the solvent was distilled off. Fresh xylene was added and the process repeated three times. The zeolite was thereafter washed with benzene. The following analysis was obtained on the zeolite product:

| Component | Wt. % Found | Wt. % on Anhydrous |
|---|---|---|
| $SiO_2$ | 56.2±0.5 | 75.6 |
| $Al_2O_3$ | 9.2±0.5 | 12.4 |
| $Na_2O$ | 4.1±0.2 | 5.5 |
| $Cr_2O_3$ | 3.4±0.2 | 4.6 |
| LOI | 25.7±0.5 | |
| Oxide Molar Ratios: | | |
| $SiO_2/Al_2O_3$=10.4) Same as | | |
| $Na_2O/Al_2O_3$=0.74) Starting material. | | |
| $SiO_2/(Al_2O_3+Cr_2O_3)$=8.35 | | |

An X-ray diffraction analysis of this product showed the retention of the basic structure of the Y-zeolite structure, although the presence of some amorphous material was apparent. No new lines indicative of chrominum oxides, hydrated or anhydrous, were observed.

What is claimed is:

1. Process for increasing the $SiO_2/Al_2O_3$ molar ratio of a large pore crystalline molecular sieve zeolite by extracting framework aluminum therefrom which comprises removing sufficient cations from the zeolite so that at least 20 percent of the aluminum atoms of the zeolite framework are not associated with a cation, dehydroxylating the cation-deficient zeolite by removing the OH having an infrared stretching frequency in the ranges of 3,600 to 3,660 cm.$^{-1}$ or 3,500–3,560 cm.$^{-1}$ from association with the framework aluminum atoms desired to be removed and thereafter contacting the resulting cation deficient and at least partially dehydroxylated zeolite with at least one of the extractants acetylacetone and a metal acetylacetonate for a period of time to form aluminum acetylacetonate, and separating the zeolite from the aluminum acetylacetonate thus produced.

2. Process according to claim 1 wherein the cation deficient zeolite is thermally dehydroxylated by heating at a temperature of from about 400° C. up to the crystal destruction temperature.

3. Process according to claim 2 wherein the extractant is acetylacetone and the extraction of framework aluminum from the zeolite is carried out at a temperature of from 0° to 200° C.

4. Process according to claim 3 wherein the starting zeolite has a $SiO_2/Al_2O_3$ molar ratio greater than 3.

5. Process according to claim 3 which includes the further step of contacting the zeolite after extraction with acetylacetone with a metal acetylacetonate.

6. Process according to claim 5 wherein the metal of the metal acetylacetonate is one which forms a trivalent oxide thermally stable at 600° C.

7. Process according to claim 5 wherein the metal of the metal acetylacetonate is one which forms a tetravalent oxide thermally stable at 600° C.

8. Process according to claim 5 wherein the meta of the metal acetylacetonate is one which forms a pentavalent oxide thermally stable at 600° C.

* * * * *